United States Patent [19]

Renard

[11] Patent Number: 4,780,633
[45] Date of Patent: Oct. 25, 1988

[54] ALTERNATOR HAVING A LOW OUTPUT-VOLTAGE HARMONIC CONTENT

[75] Inventor: Michel Renard, Rue de Belfond, France

[73] Assignee: Societe Leroy Somer, Angouleme Cedex, France

[21] Appl. No.: 22,622

[22] Filed: Mar. 3, 1987

[30] Foreign Application Priority Data

Mar. 7, 1986 [FR] France .................. 86 03235

[51] Int. Cl.⁴ ............................................. H02K 3/00
[52] U.S. Cl. .................................. 310/186; 310/68 R; 310/171; 310/184; 322/58
[58] Field of Search .......... 310/186, 68 R, 180, 310/187, 179, 185, 182, 177, 196, 184, 198, 68 D, 165, 171, 156, 269; 322/46, 58

[56] References Cited

U.S. PATENT DOCUMENTS

| 4,097,754 | 6/1978 | Farr | 322/58 |
|---|---|---|---|
| 4,454,465 | 6/1984 | Greene | 310/184 |
| 4,573,003 | 2/1986 | Lipo . | |

FOREIGN PATENT DOCUMENTS

| 364374 | 8/1906 | France . | |
|---|---|---|---|
| 1513615 | 2/1968 | France . | |
| 0046651 | 4/1981 | Japan | 310/68 D |
| 0830615 | 5/1981 | U.S.S.R. | 310/68 D |
| 2114819 | 8/1983 | United Kingdom . | |

Primary Examiner—R. Skudy
Attorney, Agent, or Firm—Young & Thompson

[57] ABSTRACT

An alternator of the single-phase type in particular is composed of an armature (1) provided with at least one winding (2) and an inductor (3) comprising on the one hand a magnetic circuit (4) having at least one pair of poles (5) with lateral pole shoes (6) and on the other hand at least one excitation winding (2) formed around said magnetic circuit (4), the inductor (3) and armature (1) being rotatable with respect to each other. At least one pole (5) is provided in the vicinity of at least one pole shoe (6) with a slot (9) occupied by a corrector winding (8) which embraces the pole shoe (6) and is connected electrically so as to permit the flow of substantially direct current through the corrector winding during service.

9 Claims, 1 Drawing Sheet

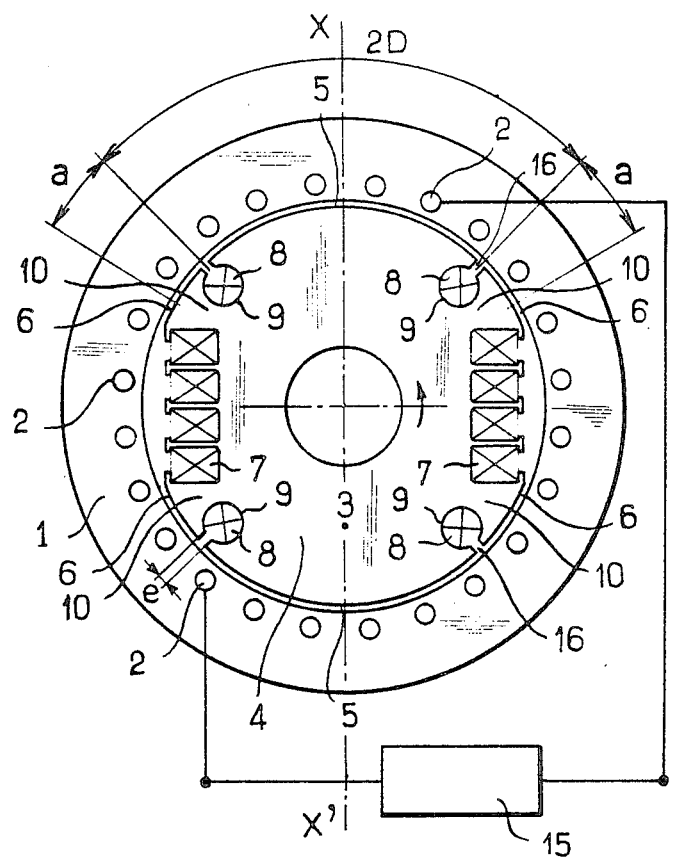
FIG_1
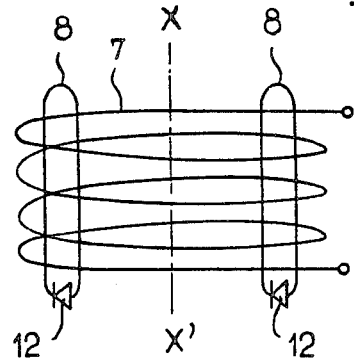
FIG_2
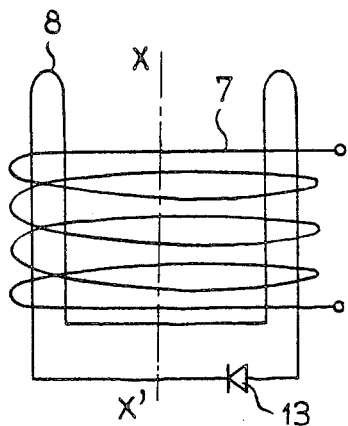
FIG_3

ALTERNATOR HAVING A LOW OUTPUT-VOLTAGE HARMONIC CONTENT

BACKGROUND OF THE INVENTION

1. Field of the Invention

The present invention relates to an alternator in which the generated voltage contains a low porportion of harmonics.

The invention is primarily but not exclusively directed to single-phase alternators in which the inductor (field core) has one pair of poles.

2. Description of the Prior Art

As is already known, the armature reaction field produced within the armature of an alternator as a result of the current which flows therein has a positive sequence component and a negative sequence component with respect to the inductor, the frequency of the negative sequence component being double the frequency of the current which flows within the armature.

Saturation of the pole shoes as a result of the positive sequence component of the armature reaction field causes deformation of the magnetic flux distribution within the air-gap. This has the contributory effect of inducing in the armature windings an electromotive force which contains a high proportion of third harmonics.

Moreover, in single-phase alternators, the negative sequence component of the armature reaction field induces in the field windings of the inductor an electromotive force and a current having a frequency which is double that of the current within the armature. This has the effect of generating a so-called "reflected" field which gives rise to additional iron losses within the magnetic circuit of the inductor, thereby increasing heat build-up during operation of the alternator. This reflected field also induces in the stator an electromotive force whose frequency is three times that of the current which flows within the armature, thus further increasing the proportion of third harmonics. In point of fact, this third-harmonic content has a particularly unfavorable effect on the operation of certain types of supplied equipment.

In order to reduce the proportion of third harmonics in the electromotive force of the armature, certain manufacturers propose to wind the armature of the alternator with a special winding having a reduced pitch. However, this solution is costly and results in the construction of so-called special machines which, in addition, have to be declassified or declared obsolete in most instances.

Accordingly, the aim of the invention is to propose an alternator in which the third-harmonic content of the output voltage is reduced to a minimum, independently of the type and nature of the armature winding.

SUMMARY OF THE INVENTION

In accordance with the invention, the alternator which is composed of an armatue provided with at least one armature winding and an inductor comprising on the one hand a magnetic circuit having at least one pair of poles adapted to carry lateral pole shoes and on the other hand at least one excitation winding formed around the magnetic circuit, the inductor and the armature being movable in rotation with respect to each other, is distinguished by the fact that at least one of the poles is provided in the vicinity of at least one of its pole shoes with a slot occupied by a corrector winding which embraces said pole shoe and which is connected electrically so as to permit the flow of substantially direct current through said corrector winding during service.

The substantially direct current which passes through the corrector winding produces a magnetic field for modifying the saturation of the pole shoes which are surrounded by said corrector winding. This modification of the state of saturation of the pole shoes has an influence on the fields which are generated within the armature and are closed within the pole shoes. This results in modifications of the magnetic fluxes within the armature in a direction which reduces the proportion of third harmonics.

The corrector winding also takes part in reduction of iron losses within the magnetic circuit of the inductor since it permits attenuation of the reverse field. It has been found in addition that the curves of output current intensity as a function of the excitation current intensity at $\cos \phi = 0.8$ and $\cos \phi = 1$ are closer together in the case of an alternator equipped with at least one corrector winding in accordance with the invention. This has a favorable effect on regulating processes.

In an advantageous embodiment of the invention relating to a single-phase alternator, the ends of the corrector winding are connected to the terminals of a diode.

As it passes through the field core or so-called inductor, the negative sequence component induces at the terminals of the corrector winding an electromotive force which gives rise within said corrector winding to a current which is rectified by the diode. This current is similar to a direct current and induces a constant magnetic field which tends to modify the state of saturation of the pole shoe or shoes surrounded by said winding. Thus, in the case of a single-phase alternator, the existence of the negative sequence component within the inductor is utilized for spontaneously generating the current required within the corrector winding.

Preferably, the axis of the corrector winding is substantially perpendicular to the axis of the poles.

The induction effect of the reverse field on the corrector winding is thus optimized.

BRIEF DESCRIPTION OF THE DRAWINGS

FIG. 1 is a schematic sectional view of a single-phase two-pole alternator in accordance with the invention.

FIG. 2 is a schematic diagram of the electric circuit of the inductor of FIG. 1.

FIG. 3 is a diagram which is similar to FIG. 2 but relates to an alternative embodiment.

DESCRIPTION OF THE PREFERRED EMBODIMENTS

In FIG. 1, there is shown a single-phase alternator comprising an armature 1 equipped with an armature winding 2 connected to the terminals of a load 15 and a field core or so-called inductor 3 which includes a magnetic circuit 4 having a pair of poles 5, each pole being adapted to carry two opposite lateral pole shoes 6. Four excitation windings 7 are formed around the magnetic circuit 4 between the two poles 5 along an axis substantially parallel to the axis X—X' of the poles 5. The inductor 3 and the armature 1 are capable of rotating with respect to each other. As a general rule, the inductor 3 is the rotor and the armature 1 is stationary.

The elements mentioned in the foregoing are constructed and mounted in the conventional manner.

In accordance with the invention, the inductor 3 further includes two corrector windings 8 located on each side of the axis X—X' of the poles 5. Each corrector winding 8 surrounds the magnetic circuit 4 in a plane parallel to the axis X—X' and passes through a pair of slots 9. Each slot is formed in a different pole 5 so as to open in the substantially cylindrical surface of said pole. A neck 10 is determined by each slot 9 between one of the pole shoes 6 of the corresponding pole 5 and the remainder of the magnetic circuit 4. Each corrector winding 8 embraces the two necks 10 adjacent to the two slots 9 occupied by said winding.

The axis of the corrector windings 8 is substantially perpendicular to the axis X—X' of the poles 5.

As shown in FIG. 2, each corrector winding 8 is in the form of a closed loop, and the ends of each corrector winding 8 are connected to the terminals of a diode 12.

In the alternative embodiment illustrated in FIG. 3, the two corrector windings 8 are mounted in series at the terminals of a diode 13.

The necessary insulations are provided between the excitation windings 7, the corrector windings 8 and the magnetic circuit 4.

The operation of the alternator under consideration is as follows:

When the inductor 3 is excited by a direct current of suitable intensity supplied to its excitation windings 7 and when the winding 2 of the armature 1 is connected to the terminals of the load 15, the armature reaction ampere-turns give rise to a magnetic field which has an even component or so-called reverse field having a frequency which is double the nominal frequency.

Part of said reverse field penetrates into the magnetic circuit 4 of the inductor 3 through the pole shoes 6 by passing through the corrector windings 8 and induces at the terminals of these corrector windings 8 an electromotive force which produces a current within said corrector windings 8. This current is rectified by the diode 12, 13 which is connected to the terminals of said windings 8. Said rectified current is similar to a direct current and generates a constant magnetic direct-current field for self-saturation (namely which does not require an auxiliary current supply) of the pole shoes 6 which are surrounded by the corrector windings 8. More specifically, the field generated by the corrector windings is added to the main field produced by the inductor windings within one of the shoes of each pole and is subtracted from the main field within the other shoe of each pole. This modification of the state of saturation of the pole shoes has the effect of deforming the field lines within the armature in a direction which reduces the proportion of third harmonics in the voltage produced by the alternator.

The present Applicant has carried out comparative tests on two single-phase two-pole alternators rated at 6 kvA, 50 Hz, 3000 rpm at cos $\phi = 1$. A first alternator was not provided with a corrector winding whereas a second alternator was provided with corrector windings in accordance with the present invention. In the first case, the third-harmonic content of the generated voltage wave was found to be 23% whereas the measured third-harmonic content in the second case was found to be no higher than 9% under identical operating conditions.

The present Applicant has also observed that the corrector windings 8 performed a contributory role in reducing iron losses within the magnetic circuit 4 of the inductor 3 and additionally permitted enhanced regulation of the alternator output voltage as a function of the load.

Complementary tests have served to demonstrate that optimum correction is achieved when the following conditions are satisfied:

each pole extends through an angle substantially equal to 120° and the angle subtended by the arc between the centers of two slots 9 of one and the same pole 5 is substantially equal to 90°;

the slots have a maximum cross-section which nevertheless takes into account the additional harmonics produced by the presence of said slots when the alternator is running on no load. The slot cross-section can be chosen for example so as to ensure that the individual no-load harmonic content does not exceed 2%;

the minimum slot width (e) is determined as a function of the diameter of the corrector-winding wires and of the mechanical strength of the nose 16 formed by the slot opening;

in the case of each pole 5, the main magnetic flux which passes through the pole shoes 6 is provided with a passage cross-section twice the angle a shown in FIG. 1 at least equal to 20% of the passage cross-section 2D delimited for said main flux between the two slots 9 of the pole 5 considered.

As will be readily apparent, the invention is not limited to the example described in the foregoing.

In particular, the corrector windings can each surround a single neck 10. In other words, there would be four corrector windings within the two-pole inductor shown in the figure, namely one corrector winding around each pole shoe if all the shoes were equipped In another embodiment, the corrector windings could each pass through two diametrically opposite slots.

What is claimed is:

1. A single-phase alternator composed of an armature (1) provided with at least one armature winding (2) and an inductor (3) comprising a magnetic circuit (4) having at least one pair of poles (5) provided with lateral pole shoes (6), said inductor (3) also comprising at least one excitation winding (7) formed around said magnetic circuit (4), the inductor (3) and the armature (1) being movable in rotation with respect to each other, wherein at least one of the poles (5) is provided in the vicinity of at least one of its pole shoes (6) with a slot (9) occupied by a corrector winding (8) which embraces said at least one of its pole shoes (6) and which is in the form of a closed circuit loop including a diode (12) for allowing flow of current in only one direction in the corrector winding (8).

2. A single-phase alternator to claim 1, wherein the axis of the corrector winding (8) is substantially perpendicular to the axis (X—X') of the poles.

3. A single-phase alternator to claim 1, wherein said alternator comprising at least two corrector windings (8) mounted in series in said circuit loop.

4. A single-phase alternator according to claim 1, wherein said alternator comprises at least one second corrector winding (8), in the form of a second closed circuit loop including a second diode for allowing flow of current in only one direction in said second circuit loop.

5. A single-phase alternator to claim 1, wherein the cross-section of the slot or slots (9) is so determined that the individual harmonic content of the output voltage delivered by the alternator on no load does not exceed substantially 2%.

6. A single-phase alternator to claim 1, wherein the corrector winding (8) surrounds the magnetic circuit (4) and passes within two slots (9) formed in two different poles (5).

7. A single-phase alternator to claim 1, wherein the two slots (9) aforesaid are located on the same side of the axis of the poles (X—X').

8. A single-phase alternator according to claim 1, wherein each pole (5) extends through an angle substantially equal to 120° and is provided with two slots (9) each of which is located in the vicinity of a respective said pole shoe (6), and wherein the arc extending between the two slots (9) of one and the same pole (5) subtends an angle substantially equal to 90°.

9. A single-phase alternator according to claim 8 wherein, in the case of each pole (5) a magnetic flux passage cross-section within the pole shoes (6) is at least equal to 20% of a flux passage cross-section (2D) delimited between the two slots (9) of the pole (5) considered.

* * * * *